(12) United States Patent
Shimizu

(10) Patent No.: US 8,005,329 B2
(45) Date of Patent: Aug. 23, 2011

(54) COMBINED STRUCTURE OF OPTICAL WAVEGUIDE

(75) Inventor: Yusuke Shimizu, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 113 days.

(21) Appl. No.: 12/536,051

(22) Filed: Aug. 5, 2009

(65) Prior Publication Data

US 2010/0034501 A1    Feb. 11, 2010

(30) Foreign Application Priority Data

Aug. 7, 2008   (JP) ................................. 2008-203748

(51) Int. Cl.
G02B 6/32 (2006.01)
G02B 6/02 (2006.01)

(52) U.S. Cl. ............ 385/39; 385/131; 385/132; 385/146

(58) Field of Classification Search ..................... 385/33, 385/39, 44–46, 123, 129–132, 146, 147
See application file for complete search history.

(56) References Cited

U.S. PATENT DOCUMENTS

| | | | | |
|---|---|---|---|---|
| 4,564,262 | A | * | 1/1986 | Shaw ............................. 385/30 |
| 6,445,857 | B1 | * | 9/2002 | Korenaga et al. ............... 385/52 |
| 2003/0048997 | A1 | * | 3/2003 | Nobuhara et al. ............... 385/84 |
| 2010/0220957 | A1 | * | 9/2010 | Asahi et al. .................... 385/39 |

FOREIGN PATENT DOCUMENTS

| | | |
|---|---|---|
| JP | 11-232024 A | 8/1999 |
| JP | 2004-295644 A | 10/2004 |

* cited by examiner

*Primary Examiner* — Daniel Petkovsek
(74) *Attorney, Agent, or Firm* — Westerman, Hattori, Daniels & Adrian, LLP

(57) ABSTRACT

A combined structure of optical waveguides with high accuracy can be easily materialized by arranging cutout sections 11a and 12a for half-lap joint in a light-emitting sided-optical waveguide and a light-receiving sided-waveguide to combine both of the cutout sections by a half-lap joint 13. This enables to significantly reduce time for minor adjustments after assembling.

7 Claims, 4 Drawing Sheets

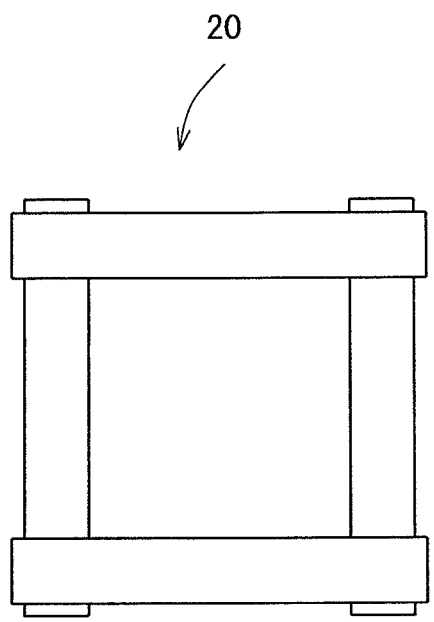
FIG. 2 (a)
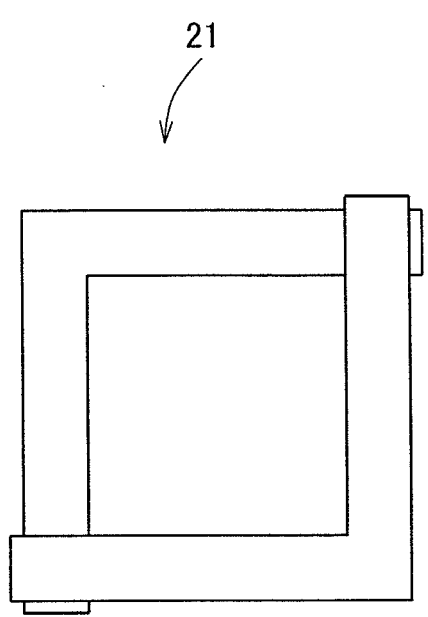
FIG. 2 (b)
FIG. 3
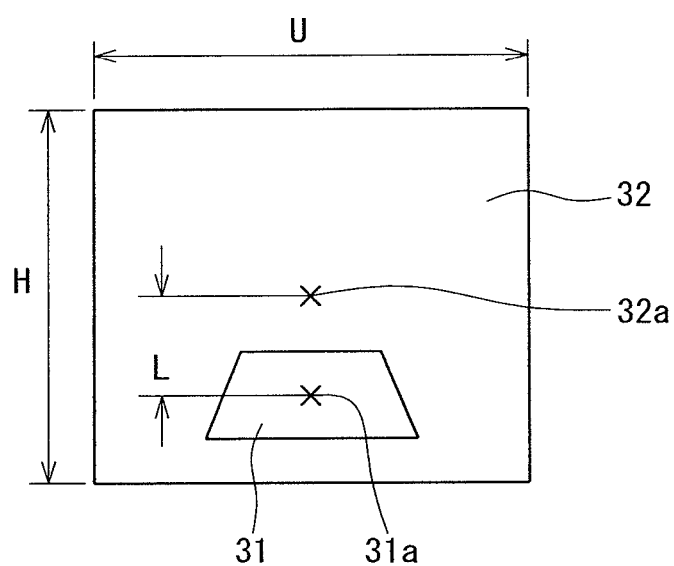

FIG. 4
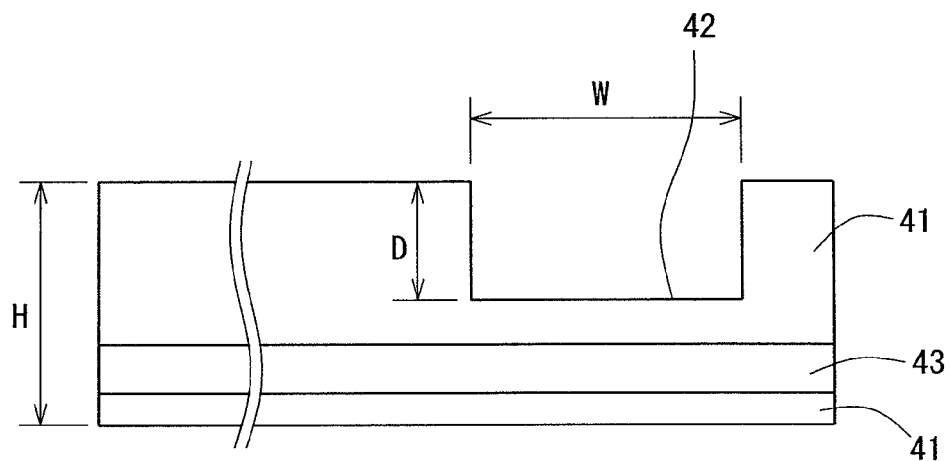
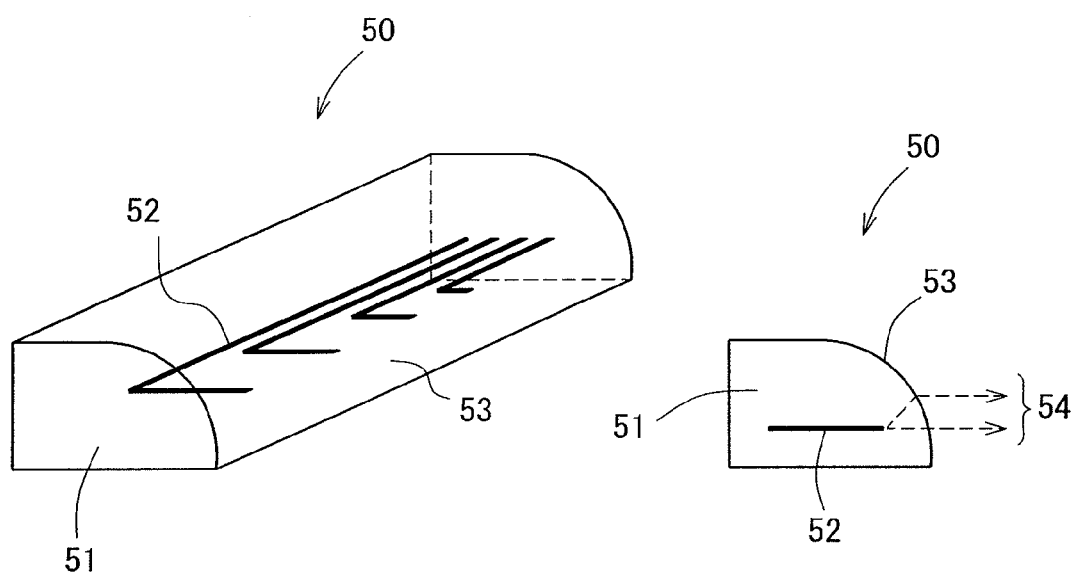
FIG. 5 (a)   FIG. 5 (b)

COMBINED STRUCTURE OF OPTICAL WAVEGUIDE

BACKGROUND OF THE INVENTION

1. Field of the Invention

The present invention relates to a combined structure of optical waveguides used for an optical touch panel or the like. More particularly, the present invention relates to a combined structure in which high combination accuracy is easily obtained.

2. Description of the Related Art optical waveguides, which are light-weight and capable of carrying out a high-speed signal transmission, have been expected to be utilized as various kinds of electronic devices. Optical touch panels are widely used for bank ATM systems or railway ticket-vending machines and the like because the display screens are clear and excellent in reliability compared with resistive touch panels and capacitance-type touch panels. Optical touch panels in which a large number of light-emitting diodes and phototransistors are arranged around a coordinate input region, are known (Japanese Unexamined Patent Publication No. 11-232024 A). Further, optical touch panels in which optical waveguides and microlenses are provided around the coordinate input region are known (Japanese Unexamined Patent Publication No. 2004-295644 A). The latter optical touch panels using optical waveguides have fewer parts than the former optical touch panels, which leads to easy to reduce the costs. However, the optical touch panels using optical waveguides need alignment of cores to accurately receive light emitted from a core of a light-emitting sided-optical waveguide at a core of a light-receiving sided-optical waveguide. However, in conventional optical touch panels, an alignment between the light-emitting sided-optical waveguide and the light-receiving sided-optical waveguide has been manually performed by repeating minor adjustments, which is a troublesome and time-consuming operation.

In an optical touch panel using an optical waveguide, alignment of cores of a light-emitting sided-optical waveguide and cores of a light-receiving sided-optical waveguide need to be performed to accurately receive light emitted from the cores of the light-emitting sided-optical waveguide (light-emitting sided-cores) at the cores of the light-receiving sided-optical waveguide (light-receiving sided-cores). However, conventionally, to align the cores, the alignment of the light-emitting sided-optical waveguide and the light-receiving sided-optical waveguide has been manually performed while repeating minor adjustments, which is a troublesome and time-consuming operation.

SUMMARY OF THE INVENTION

A combined structure of optical waveguides with high accuracy can be easily materialized by respectively arranging a cutout section for half-lap joint in a light-emitting sided-optical waveguide and a light-receiving sided-waveguide to combine both of the optical waveguides by half-lap joint. This enables to significantly reduce time for minor adjustments after assembling.

The gist of the present invention is described as follows:

In a first preferred embodiment, a combined structure of optical waveguides combined by a plurality of optical waveguides according to the present invention, each of the optical waveguides comprises: a cladding-layer; and a plurality of cores embedded in the cladding layer, wherein the cladding-layer has a cutout section in a portion where the cores are not included, in the combined structure, the optical waveguides are combined together by a half-lap joint of the cutout sections.

In a second preferred embodiment of the combined structure of optical waveguides according to the present invention, the center of the cores is not coincident with the center of the cladding layer in a cross section perpendicular to a long axis of the cores in an optical waveguide.

In a third preferred embodiment of the combined structure of optical waveguides according to the present invention, in the optical waveguide, the center of the cladding-layer is located outside the cores in a cross section perpendicular to the long axis of the cores in the optical waveguide.

In a fourth preferred embodiment of the combined structure of optical waveguides according to the present invention, a plurality of optical waveguides are combined together so as to be mutually orthogonal.

In a fifth preferred embodiment of the combined structure of optical waveguides according to the present invention, a plurality of waveguides are combined together so as to form a rectangular shape.

In a sixth preferred embodiment of the combined structure of optical waveguides according to the present invention, either one or both of a light-releasing end and a light-incident end of the cladding layer are molded into lens shapes.

ADVANTAGE OF THE INVENTION

A combined structure with high accuracy can be easily obtained by respectively arranging a cutout section for half-lap joint in a light-emitting sided-optical waveguide and a light-receiving sided-waveguide to combine both of the cutout sections by half-lap joint. This enables to significantly reduce time for minor adjustments after assembling.

For a full understanding of the present invention, reference should be made to the following detailed description of the preferred embodiments of the invention as illustrated in the accompanying drawings.

BRIEF DESCRIPTION OF THE DRAWINGS

FIGS. 2(a) to 2(b) are schematic views that respectively show a combined structure of optical waveguides of the present invention;

FIG. 3 is a cross-sectional view of optical waveguides to be used in the present invention;

FIG. 4 is a cross-sectional view of an optical waveguide to be used in the present invention;

FIGS. 5(a) to 5(b) are schematic views that respectively show an optical waveguide to be used in the present invention.

DESCRIPTION OF THE PREFERRED EMBODIMENTS

Figure 1:
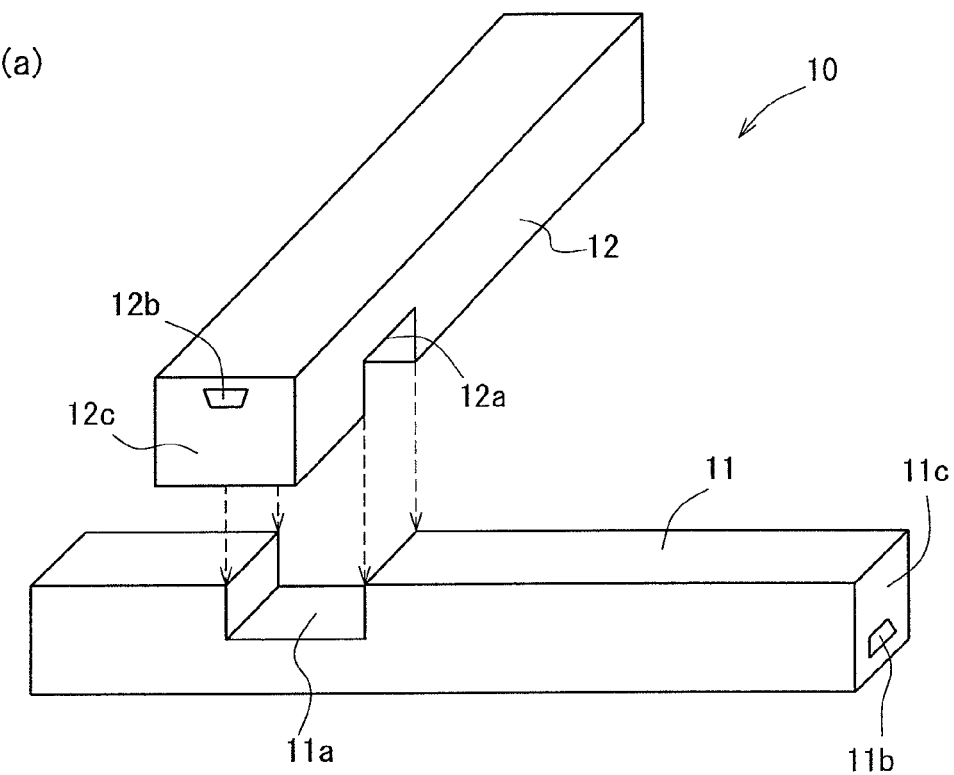
FIGS. 1(a) to 1(b) are schematic views that respectively show a combined structure of optical waveguides of the present invention.
Figure 1:
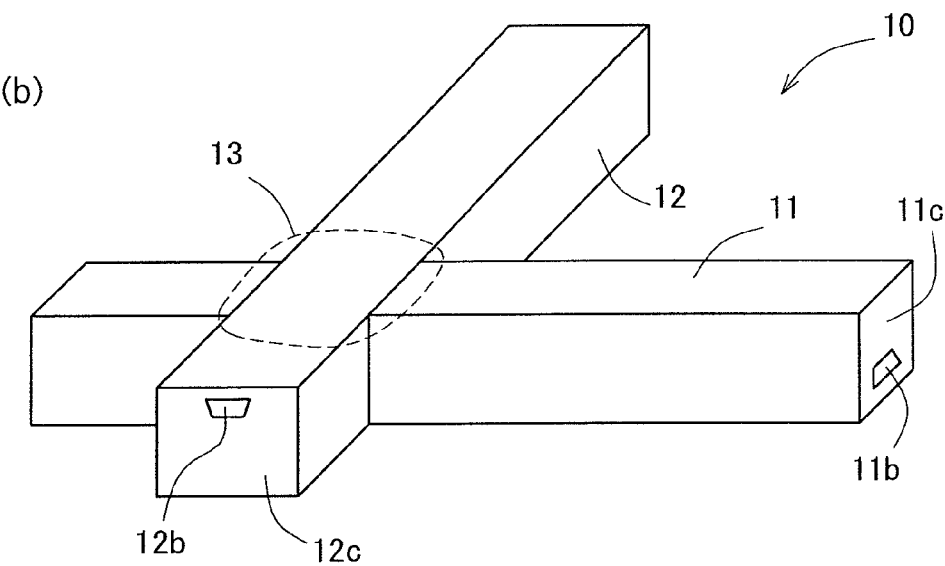
Figure 6:
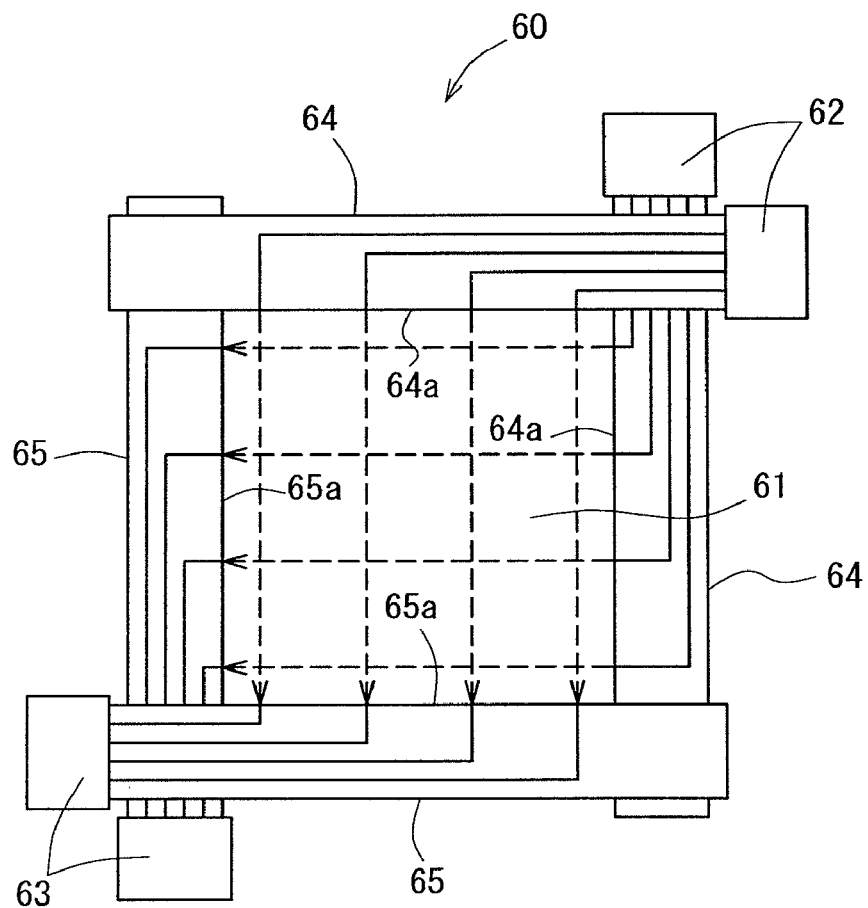
FIGS. 6(a) to 6(b) are schematic views that respectively show an optical touch panel using the combined structure of optical waveguides of the present invention.
Figure 6:
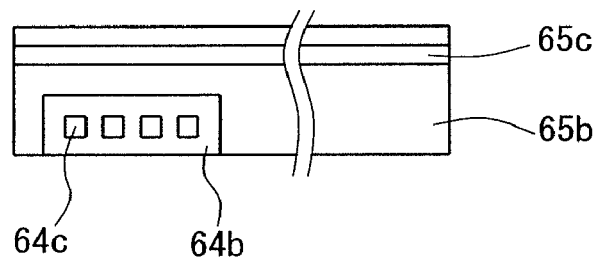

The preferred embodiments of the present invention will now be described with reference to FIGS. 1 to 6 of the drawings. Identical elements in the various figures are designated with the same reference numerals.

[Combined Structure of Optical Waveguides]

A combined structure of optical waveguides of the present invention is obtained by the combination of a plurality of optical waveguides which respectively include a cladding layer and a plurality of cores embedded in the cladding layer, wherein the cladding layer has a cutout section in a portion where the cores are not included, and respective cutout sections in the optical waveguides are combined together by a half-lap joint. FIGS. 1(a) to 1(b) schematically show a part of a combined structure 10 of optical waveguides. FIG. 1(a) shows a transverse optical waveguide 11 and a longitudinal optical waveguide 12 before being combined together. The optical waveguides 11 and 12 respectively have cutout sections 11a and 12a having a ½ depth of these optical waveguides, and the cutout sections 11a and 12a are tightly fit in. This structure is generally called "half-lap joint." FIG. 1(b) is a schematic view showing that the transverse optical waveguide 11 and the longitudinal optical waveguide 12 are half-lap jointed. A combined structure with high accuracy can be easily made when the half-lap joint is accurate in the position of the cutout sections and the dimensions. In the case of the optical waveguides 11 and 12 of the present invention, the cutout sections 11a and 12a can be accurately formed using a molding die. Accordingly, the combined structure 10 of optical waveguides can be made with high accuracy, so that the alignment of the optical waveguides 11 and 12 can be completed in a short time.

As shown in FIGS. 1(a) to 1(b), the optical waveguides 11 and 12 to be used for the combined structure 10 of optical waveguides are positioned where cores 11b and 12b do not pass through the cutout sections 11a and 12a on cladding layers 11c and 12c. Since the cores 11b and 12b are neither cut nor exposed by the cutout sections 11a and 12a, light passing through the cores 11b and 12b are not subjected to the cutout sections 11a and 12a. As shown in FIG. 1(b), the cores 11b and 12b cross a half-lap joint section 13 when two optical waveguides 11 and 12 are half-lap jointed. Accordingly, even if there is a half-lap joint in the middle, the cores 11b and 12b are not affected, which leads to perform light transmission without any problems with each of the cores 11b and 12b.

In the combined structure of optical waveguides of the present invention, a plurality of optical waveguides are preferably combined together so as to be orthogonal to each other and are more preferably combined together so as to form a rectangular shape. Example of the combined structure of optical waveguides in a shape of rectangle include a combined structure 20 of optical waveguides which combines four linear-type optical waveguides together in a grid as shown in FIG. 2(a) and a combined structure 21 of optical waveguides which combines two L-shaped optical waveguides as shown in FIG. 2(b).

[Optical Waveguide]

An optical waveguide to be used in the present invention includes a cladding layer and a plurality of cores embedded in the cladding layer, wherein the cladding layer has a cutout section in a portion where the cores are not included. In a cross section perpendicular to the long axis of the cores of the optical waveguide shown in FIG. 3, the height H of the optical waveguide is preferably 50 μm to 40 mm, more preferably 100 μm to 20 mm. The width U of the optical waveguide is preferably 50 μm to 40 mm, more preferably 100 μm to 20 mm.

In the optical waveguide, as shown in FIG. 3, it is preferable that a center 31a of the core 31 is not coincident with a center 32a of the cladding layer 32 in a cross section perpendicular to the long axis of the core. As shown in the figure, it is more preferable that the center 32a of the cladding layer 32 is located outside the core 31. This enables to prepare optical waveguides respectively having a cutout section which is as deep as ½ of the height of the cladding layer 32 in a portion of the cladding layer 32 where the core 31 is not included and to combine a plurality of optical waveguides together in such a manner that the height of the outer surfaces of two optical waveguides are identical (surface position) by half-lap joint at a joint. While FIG. 3 shows an example in which the center 31a of the core 31 deviates downward the center 32a of the cladding layer 32, the direction that the center 31a of the core 31 deviates may be either of side to side and up and down. The distance L from the center 31a of the core 31 to the center 32a of the cladding layer 32 is preferably 20 μm to 5 mm, more preferably 30 μm to 1 mm.

The core 31 to be used in the present invention is made of a material having a higher refractive index than the cladding layer 32 and high transparency at a wavelength of light that propagates. The material for forming the core 31 is preferably a UV curable resin having excellent patterning properties. Preferred examples of such a UV curable resin include UV curable acrylic resins, UV curable epoxy resins, UV curable siloxane resins, UV curable norbornene resins, and UV curable polyimide resins or the like.

The refractive index difference between the core 31 and the cladding layer 32 is preferably 0.01 or more, more preferably 0.02 to 0.2. The refractive index of a resin for forming the core 31 and the cladding layer 32 can be increased or decreased by introducing an organic group appropriately selected into the resin or changing the organic group content in the resin. For example, the refractive index of the resin can be increased by, for example, introducing a cyclic aromatic group (e.g., a phenyl group) into a resin molecule or increasing a cyclic aromatic group content per resin molecule. On the other hand, the refractive index of the resin can be decreased by, for example, introducing a linear or cyclic aliphatic group (e.g., a methyl group or a norbornene group) into a resin molecule or increasing a linear or cyclic aliphatic group content per resin molecule.

The cross-sectional shape perpendicular to the long axis of the core 31 is not particularly limited, but is preferably trapezoidal or rectangular from the viewpoint of patterning properties. The width of the base of the core 31 is preferably 10 to 500 μm and the height of the core 31 is preferably 10 to 100 μm. When the core 31 is trapezoidal or rectangular, its height is the length of a line to connect a midpoint of the upper base of the core 31 to a midpoint of the lower base of the core 31 in a cross section perpendicular to the long axis of the core 31.

The cladding layer 32 to be used in the present invention is composed of any materials having a lower refractive index than the core 31. While the material for forming the cladding layer 32 is not particularly limited, an ultraviolet curable resin having superior formability is preferable. The ultraviolet curable resin is appropriately selected from the above.

When the cladding layer 32 comprises an under-cladding layer (not shown in figures) and an over-cladding layer (not shown in figures), the under-cladding layer preferably has a thickness of 5 μm to 10 mm. The thickness of the over-cladding layer is in the range of 10 μm to 30 mm and is set thicker than the under-cladding layer.

As one example is shown in FIG. 4, a cutout section 42 formed on a cladding layer 41 is arranged in a portion where a core 43 is not included. The depth D of the cutout section is preferably 0.4 H to 0.6 H relative to the height H of an optical waveguide. To uniformly combine a plurality of optical waveguides at the same height (surface position) by half-lap joint, the depth D of the cutout section is preferably 0.5 H. It is preferable that the width W of the cutout section substantially equals to the width of the optical waveguide. The shape of the cutout section 42 is equal to the shape to correspond to the shape of the cross section of the optical waveguides engaged therein. For instance, when the cross section of the portion where the optical waveguides are engaged is trapezoidal, the cutout section is also trapezoidal.

FIGS. 5(a) and 5(b) schematically show a part of an optical waveguide 50. FIG. 5(a) is a perspective view and FIG. 5(b) is a cross-sectional view. The cutout section is not shown in the figures. There are a plurality of cores 52 in a cladding layer 51, and the cores 52 transmit light. The cladding layer 51 has an output end 53 for emitting light beams and an input end (not shown in the figures) for allowing light beams to enter and the output end 53 or the input end preferably forms a lens shape. The optical waveguide having the cladding layer 51, in which the output end 53 or the input end forms a lens shape, can convert light into parallel light beams 54 to be emitted and diffused light can be collected to be incident on the cores, which is convenient. When such optical waveguide 50 is used for an optical touch panel as described later in FIGS. 6(a) and 6(b), the allowable range of the position alignment of the height direction is wider.

The lens-shaped portion of the output end 53 or the input end is preferably prepared as a convex lens shape, and more preferably prepared as a convex lens shape, with its cross section perpendicular to the long axis of the optical waveguide being shaped into substantially a ¼ arc shape (shape formed by half-cutting a lenticular lens along its longitudinal axis). Its curvature radius is preferably set at 300 μm to 5 mm, more preferably, 500 μm to 3 mm.

Manufacturing Method of Optical Waveguides

The optical waveguides to be used in the present invention are prepared by any methods, such as a dry etching method using plasma, a transfer method, an exposing/developing method, a photo-bleaching method and the like. The optical waveguides to be used in the present invention are preferably manufactured by a manufacturing method including the following steps(a) to (c):

Step(a): forming a plurality of cores on an under-cladding layer;

Step(b): forming a resin layer by arranging a concave-shaped molding die having an injection port into a portion where cores are included on the under-cladding layer and thereafter injecting a liquid-state active energy ray-curable resin which may form an over-cladding layer from the injection port; and Step (c): curing the over-cladding layer by irradiating the active energy ray-curable resin with active energy rays from the outside of the concave-shaped molding die.

The active energy rays to be used in the step (c) are preferably ultraviolet rays. The dose of the ultraviolet rays is preferably set at 100 to 8,000 mJ/cm$^2$. Within this range, the over-cladding layer can be sufficiently cured.

Although the method for arranging a cutout section in an optical waveguide is not particularly limited, a part of the cladding layer may be cut in a cutout shape, alternatively, a concave-shaped molding die to form a cutout section may be used.

[Optical Touch Panel]

A combined structure of optical waveguides of the present invention is preferably used for an optical touch panel. As shown in FIG. 6(a) indicating one example, an optical touch panel 60 comprises: a coordinate input region 61; a plurality of light-emitting elements 62; a plurality of light-receiving elements 63; a plurality of light-emitting sided-optical waveguides 64 connected to the light-emitting elements 62; and a plurality of light-receiving sided-optical waveguides 65 connected to the light-receiving elements 63. The light-emitting sided-optical waveguides 64 respectively have a cladding layer 64b and cores 64c embedded in the cladding layer 64b and the light-receiving sided-optical waveguides 65 respectively have a cladding layer 65b and cores 65c embedded in the cladding layer 65b. And the cladding layer 64b has a cutout section (not shown in the figure) in a portion where the cores 64c are not included. And the cladding layer 65b has a cutout section (not shown in the figure) in a portion where the cores 65c are not included. Further, the light-emitting sided-optical waveguides 64 and the light-receiving sided-optical waveguides 65 are combined together so as to form the rectangular coordinate input region 61 by the half-lap joint of the cutout sections. Although FIG. 6(a) shows an example of an optical touch panel in which four linear-type optical waveguides are combined together in a grid, the optical touch panel is not limited to this and two L-shaped optical waveguides may be combined together. To make the figure clearer in FIG. 6(b), although only each four cores 64c and cores 65c are drawn in the light-emitting sided-optical waveguide 64 and the light-receiving sided-optical waveguide 65, in a practical optical touch panel, more cores are used in accordance with resolution.

In the optical touch panel 60, the output ends 64a of the light-emitting-sided optical waveguides 64 and the input ends 65a of the light-receiving-sided optical waveguides 65 are located on opposite sides of the coordinate input region 61. It is possible to allow the light emitted from the light-emitting elements 62 to cross the coordinate input region 61 to allow the light to be incident on the light-receiving elements 63. When part of the light crossing the coordinate input region 61 is blocked by a finger or a pen, the intensity of the light received by the light-receiving elements is reduced. By detecting such a reduction in light intensity, it is possible to determine the coordinates of the position of the finger or pen.

In the cutout sections, the cores 64c and 65c of each of the optical waveguides 64 and 65 are different in height, so that the cores 64c and 65c can pass through without any collision to each other. Accordingly, as shown in FIG. 6(a), the light-emitting elements 62 may be collected to be arranged at one corner and the light-receiving elements 63 may be collected to be arranged at the other corner.

[Light-Emitting Element, Light-Receiving Element]

The light-emitting element 62 is preferably a light-emitting diode or a semi-conductor laser, more preferably a Vertical Cavity Surface Emitting Laser (VCSEL). A VCSEL is excellent in light transmission because the VCSEL can emanate laser light in a vertical direction on the substrate surface by resonating light in the vertical direction of the substrate surface. The light-receiving element 63 is an element to convert an optical signal into an electric signal, preferably a light-receiving element of a one-dimensional array, more preferably a Complementary Metal-Oxide Semiconductor (CMOS) image sensor or a Charge Coupled Device (CCD) image sensor.

[Applications]

Although the applications of the optical waveguides of the present invention are not particularly limited, the optical waveguides are preferably used for, for example, optical wiring plates, an optical connectors, substrates with optical-electric devices mixedly mounted, optical touch panels and the like.

EXAMPLES

Example 1

[Preparation for Cladding-Layer-Forming Varnish]

A varnish for forming cladding layer was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

[Preparation of Varnish for Forming Cores]

A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl)butoxyphenyl)butane (its production method will be described later) (Component E), 1 part by weight of the Component B, and 41 parts by weight of ethyl lactate.

[Method for Preparing 1,3,3-tris(4-(2-(3-oxycetanyl))butoxyphenyl)butane]

A 200 ml three-necked flask having a thermometer, a condenser, and a stirrer was prepared. Then, 6.68 g (20 mmol) of 1,3,3-tris(4-hydroxyphenyl)butane and 25 ml of N-methyl-2-pyrrolidone were placed in the three-necked flask and stirred while being heated at 80° C. in an atmosphere of nitrogen until 1,3,3-tris(4-hydroxyphenyl)butane was completely dissolved in N-methyl-2-pyrrolidone. After complete dissolution, 23.46 g (72 mmol) of cesium carbonate was added thereto, and the resulting mixture was further stirred for 30 minutes. Then, 17.84 g (66 mmol) of 2-(3-oxetanyl)butyltosylate previously synthesized was added thereto, and the resulting mixture was stirred for 20 hours at 80° C. in an atmosphere of nitrogen. After the completion of reaction, the mixture was cooled to room temperature, and 100 ml of ethyl acetate and 50 ml of distilled water were added to the mixture. The resulting mixture was left standing to separate into an aqueous phase and an organic phase. The thus obtained organic phase was extracted, washed with water, and dried with anhydrous magnesium sulfate overnight. Then, magnesium sulfate was removed by filtration, and the solvent was distilled away to obtain a crude reaction product. The crude reaction product was separated and purified by silica-gel column chromatography (eluent: n-hexane/acetone) to obtain 12.20 g of a clear and colorless semisolid substance (yield: 97%). The thus obtained compound was analyzed by $^1$H-NMR and $^{13}$C-NMR spectrometers (both manufactured by JEOL Ltd.) and found to be 1,3,3-tris(4-(2-(3-oxetanyl)butoxypheny)butane.

[Production of Optical Waveguide]

The cladding-layer-forming varnish was applied to the surface of a polyethylene naphthalate film having a thickness of 188 μm, and after being irradiated with 1,000 mJ/cm$^2$ of ultraviolet rays, this was subjected to a heating treatment at 80° C. for 5 minutes so that an under-cladding layer having a thickness of 20 μm was formed. The under-cladding layer had a refractive index of 1.510 at a wavelength of 830 nm.

The core-forming varnish was applied to the surface of the under-cladding layer, and this was subjected to a heating treatment at 100° C. for 5 minutes so that a core layer was formed. The core layer was covered with a photomask (gap: 100 μm) and this was irradiated with 2,500 mJ/cm$^2$ of ultraviolet rays (Measured wavelength 365 nm), and further subjected to a heating treatment at 100° C. for 10 minutes. Unirradiated portions with ultraviolet rays of the core layer were dissolved and removed by a γ-butyrolactone aqueous solution, and this was subjected to a heating treatment at 120° C. for 5 minutes so that a plurality of cores having a core width of 20 μm and a core height of 50 μm were pattern-formed so as to obtain linear-type optical waveguides shown in FIG. 6(a). The plurality of cores respectively had a refractive index of 1.592 at a wavelength of 830 nm.

Next, a quartz molding die was placed on the surface of the under-cladding layer so as to cover the entire cores, and the varnish for forming cladding was injected into the molding die from the injection port. The concaved-shaped molding die has a convex section for forming a cutout section on the cladding layer. The varnish for forming cladding layer was irradiated with UV light at 2,000 mJ/cm$^2$ through the concave-shaped molding die and thermally-treated at 80° C. for 5 minutes. The concave-shaped molding die was removed because the varnish for forming cladding layer was cured. In this way, an over-cladding layer with a long convex lens having a side sectional shape of a substantially quarter of a circle (i.e., a shape corresponding to a semi-lenticular lens) at its distal end was formed. A cutout section was formed on the over-cladding layer. The over-cladding layer has a thickness of 1 mm. The convex lens had a radius of curvature of 1.5 mm. The refractive index of the over-cladding layer as measured at a wavelength of 830 nm was 1.510.

The aforementioned optical waveguides respectively having a cutout section on the cladding layer were prepared in quantities of four. And as shown in FIG. 6(a), a plurality of light-emitting elements (manufactured by Optwell, VCSEL) emitting light having a wavelength of 850 nm were connected to each one end of the two optical waveguides. A plurality of light-receiving elements (a CMOS linear sensor array (manufactured by TAOS)) were connected to each one end of the remaining two optical waveguides. An output end and an input end of each of the optical waveguides are disposed so as to be located on opposite sides of a coordinate input region to prepare an optical touch panel having an opposite angle of 4.2 inches.

[Evaluation]

The optical waveguide in Example 1 has a cutout section on the cladding layer, so that it is possible to perform a half-lap joint of a plurality of optical waveguides. When an optical touch panel was assembled in the Example 1, it took about 5 minutes to align the combination of the optical waveguides until light having an intensity of 10 is detected at the light-receiving elements, assuming that light intensity of the light-emitting elements is 100. On the contrary, it took over 30 minutes to align the combination of the optical waveguides until light having an intensity of 10 is detected at the light-receiving elements when linear-type optical waveguides in the same shape having no cutout section on the cladding layer which are incapable of performing a half-lap joint of a plurality of optical waveguides are used to assemble an optical touch panel.

[Measuring Method]

[Refractive Index]

The cladding-layer-forming varnish and the core-forming varnish were respectively applied to silicon wafers by a spin coating method to form films thereon so that refractive-index measuring samples were prepared, and these were measured by using a prism coupler (SPA-400, made by Thyron Co., Ltd.).

[Core Width, Core Height]

Each of the manufactured optical waveguides was cut with cross sections by using a Dicer-type cutter (DAD522, made by DISCO Co., Ltd.), and the cross-sectional face was observed and measured by using a laser microscope (made by Keyence Corporation).

This application claims priority from Japanese Patent Application No. 2008-203748, which is incorporated herein by reference.

It is to be understood that the present invention may be practiced in other embodiments in which various improvements, modifications, and variations are added on the basis of knowledge of those skilled in the art without departing from the spirit of the present invention. Further, any of the specific inventive aspects of the present invention may be replaced with other technical equivalents for embodiment of the present invention, as long as the effects and advantages intended by the invention can be insured. Alternatively, the integrally configured inventive aspects of the present invention may comprise a plurality of members and the inventive aspects that comprise a plurality of members may be practiced in a integrally configured manner.

There has thus been shown and described a novel combined structure of optical waveguides which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A combined structure, comprising:
   a plurality of optical waveguides, each of the optical waveguides including
   a cladding-layer; and
   at least one core embedded in the cladding layer,
   wherein the cladding-layer of each of said plurality of optical waveguides has a cutout section in a portion where the at least one core is not included, and the plurality of optical waveguides are combined together by a half-lap joint of the cutout section.

2. The combined structure according to claim 1, wherein the center of the at least one core is not coincident with the center of the cladding layer in a cross section perpendicular to a long axis of the at least one core of each of said plurality of optical waveguides.

3. The combined structure according to claim 2, wherein the center of the cladding layer is located outside the at least one core in a cross section perpendicular to the long axis of the at least one core of each of said plurality of optical waveguides.

4. The combined structure according to claim 1, 2 or 3, wherein the plurality of optical waveguides are combined together so as to be mutually orthogonal.

5. The combined structure according to claim 1, 2 or 3, wherein the plurality of optical waveguides are combined together so as to form a rectangular shape.

6. The combined structure according to claim 1, 2 or 3, wherein either one or both of a light-releasing end and a light-incident end of the cladding layer are molded into lens shapes.

7. The combined structure according to claim 1, 2 or 3, wherein said at least one core in one of said plurality of optical waveguides does not optically communicate with said at least one core of an adjoining one of said plurality of optical waveguides.

* * * * *